United States Patent
Nogge et al.

(10) Patent No.: US 7,870,561 B2
(45) Date of Patent: Jan. 11, 2011

(54) TECHNICAL PLACE SERVICING INTEGRATION

(75) Inventors: Wolfram Nogge, West Chester, PA (US); Ralf Kaefer, Leimen (DE)

(73) Assignee: SAP AG, Walldorf (DE)

( * ) Notice: Subject to any disclaimer, the term of this patent is extended or adjusted under 35 U.S.C. 154(b) by 912 days.

(21) Appl. No.: 11/799,048

(22) Filed: Apr. 30, 2007

(65) Prior Publication Data

US 2008/0271052 A1    Oct. 30, 2008

(51) Int. Cl.
- G06F 9/44 (2006.01)
- G06F 9/46 (2006.01)
- G06F 13/00 (2006.01)
- G06Q 10/00 (2006.01)

(52) U.S. Cl. .............. 719/313; 719/315; 719/320; 705/7; 705/305

(58) Field of Classification Search .......... 719/313, 719/315, 320; 705/7, 305
See application file for complete search history.

(56) References Cited

U.S. PATENT DOCUMENTS

| | | | |
|---|---|---|---|
| 7,526,434 B2 * | 4/2009 | Sharp | 705/10 |
| 2002/0188513 A1 * | 12/2002 | Gil et al. | 705/22 |
| 2005/0015273 A1 * | 1/2005 | Iyer | 705/1 |
| 2006/0136344 A1 * | 6/2006 | Jones et al. | 705/402 |
| 2006/0136345 A1 * | 6/2006 | Jones et al. | 705/402 |
| 2006/0287873 A1 * | 12/2006 | Heard | 705/1 |
| 2007/0198988 A1 * | 8/2007 | Kumar et al. | 719/313 |
| 2008/0133406 A1 * | 6/2008 | Wernze et al. | 705/40 |

* cited by examiner

*Primary Examiner*—Qing Wu
(74) *Attorney, Agent, or Firm*—Brake Hughes Bellermann LLP

(57) ABSTRACT

A method includes providing a technical place object to a Customer Resource Management (CRM) system wherein the technical place object includes information from an Enterprise Resource Management (ERP) system about a technical place including information associated with servicing the technical place. A service object may be provided to the ERP system wherein the service object includes information from the CRM system including information based on the technical place object and a service request associated with the servicing of the technical place. The CRM system may be provided an update of the service object wherein the update is based on a response to the service object by the ERP system.

20 Claims, 5 Drawing Sheets

TECHNICAL PLACE SERVICING INTEGRATION

TECHNICAL FIELD

This description relates to the field of technical place servicing.

BACKGROUND

With the growth in size and capability of information systems, including computer based information systems, has come an increasing number of specialized information systems, many of which need to communicate with one another to accomplish a task, such as providing better customer service or care. One example of different information systems that may need to communicate in order to provide better customer service may include a customer resource management system (CRM) system and an enterprise resource management (ERP) system.

CRM systems generally are customer service systems designed to provide better customer service between an organization and its customers. ERP systems generally are systems designed to manage an organization's resources, including storing client information. However, increasingly it may be the case that an organization or organizations may prefer to have coordination among their CRM and ERP systems, especially in the field of facility maintenance.

It may be the case that customers who need services, repairs or other maintenance to be performed on their facilities or equipment may need to interface with a CRM system of a maintenance organization. However, without coordination between the systems, the CRM system may be without information maintained by the ERP system of the maintenance organization, such as information pertaining to the facility structure and layout, including information about the equipment located at the facility. In such cases, it may be helpful for the CRM system to have access to the facility information as maintained by the ERP system, in order to gain a better understanding of the work to be done or problem to be solved. Also, without coordination between the CRM and ERP systems, it may be difficult for a CRM representative to provide a customer with accurate information concerning the status of a work order previously placed.

SUMMARY

In a first general aspect, a method includes providing a technical place object to a Customer Resource Management (CRM) system wherein the technical place object includes information from an Enterprise Resource Management (ERP) system about a technical place including information associated with servicing the technical place. A service object may be provided to the ERP system wherein the service object includes information from the CRM system including information based on the technical place object and a service request associated with the servicing of the technical place. An update of the service object may be provided to the CRM system wherein the update is based on a response to the service object by the ERP system.

In another general aspect, a system includes an Enterprise Resource Planning (ERP) system including a technical place object associated with the ERP system wherein the technical place object includes information associated with servicing a technical place; a Customer Resource Management (CRM) system configured to determine a service object wherein the service object includes information based on the technical place object and a service request associated with the servicing of the technical place, wherein the Enterprise Resource Planning (ERP) system is configured to determine an update associated with the service object wherein the update is based on a response to the service object.

In another general aspect, a method includes providing to a Customer Resource Management (CRM) system, a technical place object including information associated with servicing a technical place. Receiving a service object including information from the CRM system wherein the service object is based on the technical place object and a service request associated with the servicing of the technical place as received by the CRM system. Providing an update to the information from the CRM system wherein the update is based on a response to the service object.

The details of one or more implementations are set forth in the accompanying drawings and the description below. Other features will be apparent from the description and drawings, and from the claims.

DETAILED DESCRIPTION

Figure 1:
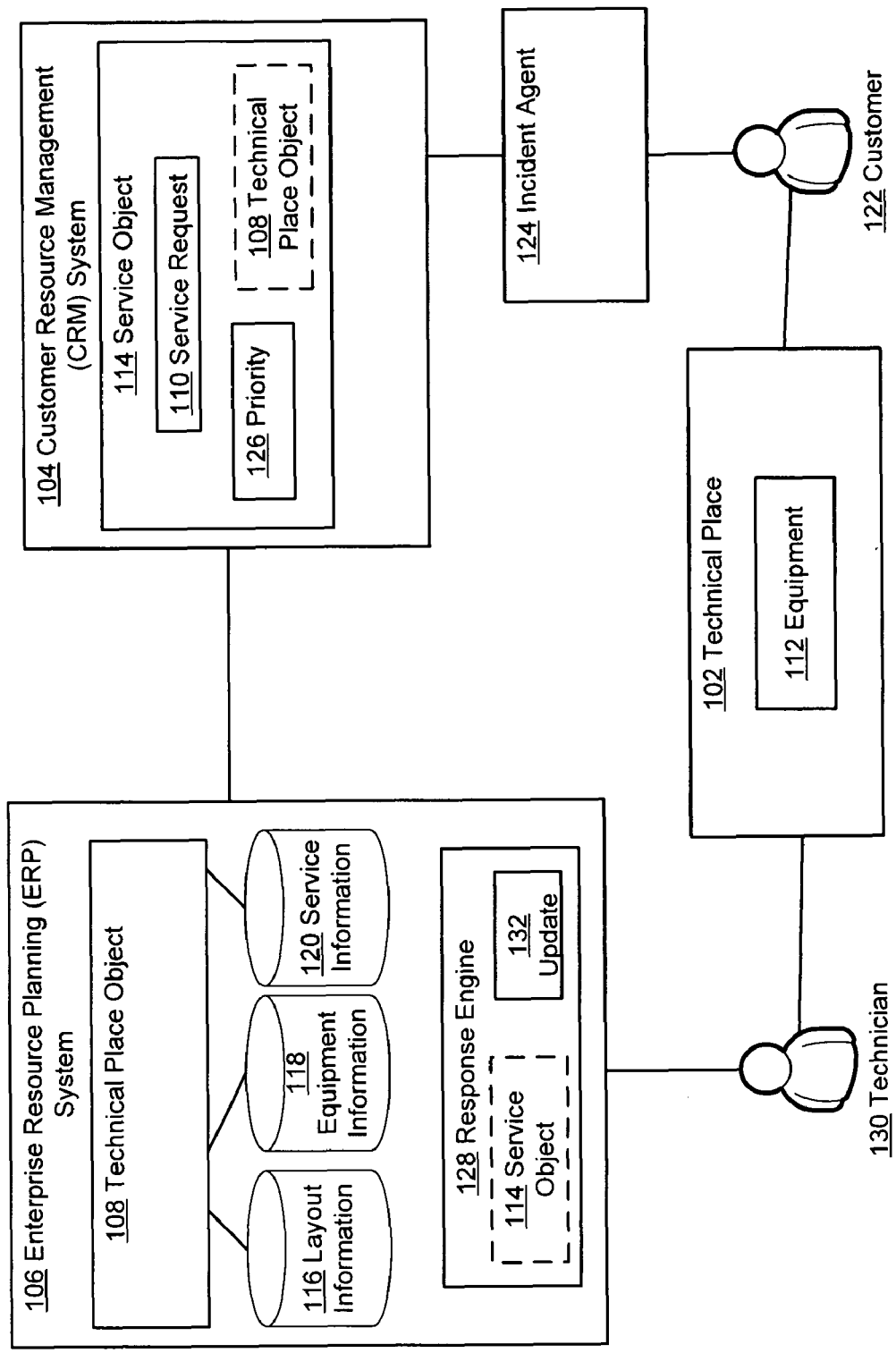
FIG. 1 is a block diagram of an example system 100 of a technical place servicing support system according to an example embodiment.

FIG. 1 is a block diagram of an example system 100 of a technical place servicing support system according to an example embodiment. In the example of FIG. 1, the system 100 may, in response to receiving notification of a servicing incident affecting a building or other facility, coordinate information between two or more systems or sub-systems configured to interface with a client reporting the incident and resolve the servicing incident, thus enabling the sub-systems to efficiently respond to the notification, address client concerns and maintain information integrity.

For example, a first sub-system may be configured to interface with the client through a customer service agent and receive notifications of problems with a facility. Then, for example, a second sub-system configured to store information about the facility may respond to service needs of the client that cannot be properly addressed by the first sub-system. The system 100 may coordinate the information stored by the second sub-system about the facility with the information received by the first sub-system about the problems, thus allowing a more efficient and effective response to the notifications.

As referenced above, the system 100 may include information about a technical place 102. The technical place 102 may include a facility, campus, store, depot, warehouse or other building or group of buildings located in one or more geographic locations. In one particular example, the technical place 102 may be an airport with multiple buildings and/or terminals. According to another example, the technical place 102 may be a university with multiple geographic campus locations, wherein each campus location may include multiple buildings. In this example, the technical place 102 may include either a campus location or one or more buildings of a particular campus. In another example embodiment, the technical place 102 may include the entire university, including the multiple campuses. In other example embodiments, the technical place 102 may include one or more portions of a building, wherein a single building or structure may include multiple technical places 102.

A customer resource management (CRM) system 104 may receive notification of service and/or maintenance problems. For example, the CRM system 104 may include a system or sub-system configured to receive notifications about incidents occurring with respect to servicing or maintaining the technical place 102. The CRM system 104 may include, for example, a web-based or other automated or partially automated system configured to receive notifications about maintenance or servicing issues affecting the technical place 102.

According to another example embodiment, the CRM system 104 may include or otherwise be associated with a customer service agent who handles phone calls when a maintenance issue arises with respect to the technical place 102. For example, the customer service agent may receive a phone call about a broken window that will not close. After a determination that the agent cannot resolve the issue over the phone, and entry of data concerning the issue into the CRM system, the CRM system 104 may automatically provide notification of the issue to an enterprise resource management (ERP) system 106 for further resolution of the issue.

The ERP system 106 may include a system or sub-system configured to determine responses to servicing and/or maintenance issues associated with the technical place 102. As discussed above, the ERP system 106 may automatically receive a service notification about the technical place 102 from the CRM system 104. Then, for example, the ERP system 106 may determine a response to the notification. For example, the ERP system 106 may determine that the parts needed to address or resolve the issue are not in stock and need to be ordered, or for example, the ERP system 106 may assign or forward the service notification to the proper technical area or service group, which may then resolve the issue. For example, a facilities engineer may respond to the technical place 102 to fix the broken window.

The ERP system 106 may store information associated with the technical place 102 in a technical place object 108. The technical place object 108 may include information about the technical place 102, including information about servicing and/or maintaining the technical place 102. For example, the technical place object 108 may include a map of the technical place 102, service records, warranty information and/or other service and/or maintenance oriented information.

Then, for example, the CRM system 104 may receive the technical place object 108 from the ERP system 106, and may coordinate with the technical place object 108 or at least a portion of the information therefrom, with a service request 110 received regarding a maintenance and/or servicing issue with the technical place 102. The service request 110 may include a service or maintenance notification about the technical place 102. For example, the service request 110 may include notification about an incident, malfunction, breakage or other issue with regards to maintaining and/or servicing the technical place 102 or equipment 112 therein. For example, the service request 110 may include a request to fix a broken toilet at the technical place 102. In another example embodiment, the technical place 102 may include an elevator that requires scheduled maintenance every six months, in which case the service request 110 may include a reminder about maintaining the elevator.

The equipment 112 may include facilities, fixtures and/or other equipment located at, housed at, or otherwise associated with the technical place 102. For example, the equipment 112 may include elevators, water fountains, refrigerators, doors, electrical systems, terminals, computers, desks, network devices and/or other equipment associated with the technical place 102. The service request 110 may include a servicing or maintenance issue regarding the equipment 112. For example, the service request 110 may include notification that a network printer (e.g., 112) no longer prints. Then, for example, the technical place 102 may be associated with the building, floor, room and/or desk at which the network printer is located.

The CRM system 104, upon receiving the service request 110 about the technical place 102 and/or equipment 112, may generate a service object 114. The service object 114 may include information anticipated to be used in addressing or otherwise responding to the service request 110. The service object 114 may include a description or other explanation of the servicing issue as identified by the service request 110. For example, the CRM system 102 may receive the service request 110 that may include notification about a broken escalator (e.g., equipment 112) in a university building. Then, for example, the CRM system 104 may determine, from the technical place object 108, that there are forty-four university buildings, including twenty-three escalators on three different geographic campuses. Then, for example, by comparing the information from the service request 110 and the technical place object 108, the CRM system 104 may be able to determine which escalator of which building on which campus is broken (i.e., the technical place 102). Then, for example, based on the technical place object 108, the service object 104 may be updated to include layout information 116, equipment information 118 and/or a service level agreement 120 associated with the technical place 102, as included with the technical place object 108.

The layout information 116 may include information associated with the layout and/or location of the technical place 102. The layout information 116 may include a blueprint and/or other map of the technical place 102. For example, the technical place 102 may be an administrative building, part of a larger campus of buildings, wherein the layout information 116 includes a map of the campus, including the administrative building, and may even include directions on how to reach the administrative building. Then, for example, if a maintenance or service engineer needs to respond to the technical place 102 to resolve the service request 110, the engineer may determine more precisely where to go by referring to the information in the service object 114.

The layout information 116 may include the location and/or layout of facilities or fixtures, including the equipment 112 within the technical place 102. For example the layout information 116 may include schematics associated with heating, air conditioning, plumbing and electrical systems and/or the location of stairs, elevators, escalators and/or moving walkways. Then, for example, if the air conditioning of an office of the technical place 102 is not working, an engineer tasked to resolve the problem may determine based on the layout information 116 that the air conditioning unit (e.g., equipment 112) responsible for cooling the office is actually located two floors below the office. Then, for example, the engineer may save time by responding directly to where the unit is located without having to locate or determine the information otherwise.

The equipment information 118 may include information about the equipment 112. For example, the equipment information 118 may include make, model, version number, serial number, manufacturer information and/or other information associated with the equipment 112. In continuing the air conditioning example above, the equipment information 118 may include the manufacturer and model number of the air conditioning unit (e.g., equipment 112).

Because the technical place object 108 can include equipment information 118, and the service object 114 in the CRM system 104 may be generated based on a combination of information contained in the technical place object 108 received form the ERP system 108 and the service request 110, the service object 114 may provide a maintenance engineer with relevant equipment information prior to arriving at the technical place 102. The service object 114 may also inform the engineer of additional information about the particular model of unit at the technical place 102, for example whether special parts and/or tools may be required to perform the required service. Or for example, the service object 114 that was generated based on the equipment information 118 may inform the engineer that the particular model of air conditioning unit used at the technical place 102 was recalled and that the manufacturer must be notified and that the entire unit must be replaced.

According to another example embodiment, the equipment information 118 may include information about the equipment 112 of a computer lab in the technical place 102, including for example information associated with what computers, printers, software, scanners, desks, chairs and/or other equipment is located in the lab.

The service information 120 may include information associated with servicing and/or maintaining the technical place 102, including responding to service requests (e.g., 110). For example, the service information 120 may include service level agreements, contracts, deals, warranties, invoices, licenses and/or other agreements associated with servicing the technical place 102. Based on the service information 120 required response times to the service requests 110, costs, scheduled maintenance, warranties, service records and/or other information associated with servicing and/or maintaining the technical place 102 and/or the equipment 112 may be determined.

For example, the ERP system 106 may determine, based on a service level agreement included in the service information 120 that two pieces of equipment 112 may require varying response times (i.e., the time until the service request 110 is resolved or the equipment 112 is to be fixed) based on the relative importance of the two pieces of equipment. For example, the service information 120 may mandate that a service request (e.g., 110) about a broken elevator (e.g., 112) receive a quicker response time than a service request about a broken water fountain (e.g., 112). According to another example embodiment, the CRM system 104 may determine from the service information 120 included with the technical place object 108 that the elevator is still under warranty, and that the water fountain has been serviced twice before in the previous two months for a similar problem.

As discussed above, the CRM system 104 may receive the service request 110. According to an example embodiment, a customer 122 may provide the service request 110 to an incident agent 124, which may provide to and/or generate for the CRM system 104, the service request 110.

The customer 122 may include an agent, employee, client or other representative associated with the technical place 102. For example, the customer 122 may be an employee who works at the technical place 102 who notices that an office of the technical place 102 is flooded. Then, for example, the employee may report or submit a service request (e.g., 110) about the flooded office to the incident agent 124.

The incident agent 124 may include a customer service representative, an automated system and/or other system or person(s) for receiving the service request 110. For example, the customer 122 may call a help line to reach the incident agent 124 to report the service request 110. Then, for example, the incident agent 124 may determine from the technical place object 108 what information to request from the customer 122. For example, in continuing the broken escalator example above, the customer 122 may call the incident agent 124 to report the broken escalator (e.g., 112).

Then, for example, while discussing the issue with the customer 122, the incident agent 124 may access the technical place object 108 via the CRM system 104. Based on the technical place object 108, including the layout information 116, equipment information 118 and service information 120, the incident agent 124 may determine what information may be necessary for the service object 114, in order to determine more precisely the nature and/or location of the problem. For example, if the customer 122 calls in to report the broken escalator, then the incident agent 124 may determine, based on the technical place object 108, that the technical place 102 about which the customer 122 is calling has six escalators in three separate buildings. Then, for example, the incident agent 124 may inquire from the customer 122 which building has the broken escalator, and which escalator in the building (if there is more than one) is broken and what precisely is the malfunction.

Then, for example, the incident agent 124 may determine whether or not the incident agent 124 may resolve the service request 110. For example, if the customer 122 was calling to check on the status of a scheduled repair to the technical place 102, then the incident agent 124 may be able to determine the status, via the CRM system 104, and provide this information to the customer 122. Or for example, if the broken escalator was a known issue, the incident agent 124 may be able to determine as such and inform the customer 122 of the repair status. In the case of the customer 122 reporting the broken escalator for the first time, the incident agent 124 may not be able to resolve the issue over the phone, whereby the ERP system 106 may handle responding to the service request 110.

The incident agent 124 may determine a priority 126 of the service request 110. The priority 126 may include a priority, importance, complexity, status or other indicator associated with the service request 108. The priority 126 may include for example, four levels. A level 1 priority may indicate that the service request 110 was a minor issue which was resolved by the incident agent 124. For example, as discussed above, a level 1 priority may be assigned to an incident if the customer 122 merely requests status information or if the service request 110 is a known issue. A level 2 priority may indicate that an issue is too complex for the incident agent 124 to resolve but that is not regarded as an emergency issue. For example, replacing a stained ceiling tile in the technical place 102 may be a level 2 priority incident. A level 3 priority may indicate the service request 110 is unresolvable by the incident agent 124 but must be addressed within 36 hours, and a level 4 priority may indicate the service request 110 is unresolvable by the incident agent 124 and must be addressed within 24 hours.

According to an example embodiment, the priority 126, may be determined based at least in part on the technical place object 108. For example, the incident agent 124 may determine, based on reviewing the service information 120 associated with the technical place object 108, that the broken escalator is a level 3 issue. Then, upon a determination of the priority 126 (i.e., upon a determination that the priority 126 is greater than level 1), the service object 114 may be provided to the ERP system 106 for further resolution.

According to an example embodiment, the incident agent 124 may be an in-house maintenance engineer employed to address minor maintenance issues affecting the technical place 102, including for example, replacing light bulbs and plunging toilets. Then, for example, the in-house engineer may determine that there exists a problem with one or more pieces of the equipment 112 that he cannot fix, for example the broken escalator. In such an instance, the in-house engineer may call in, generate and/or otherwise provide the service request 110 (i.e., report the broken escalator) to the CRM system 104.

A response engine 128 may receive the service object 114 from the CRM system 104. The response engine 128 may determine a response of the ERP system 106 to the service request 110, based on the service object 114. For example, a level 2 priority service object 114 may be placed in the back of a queue and may be addressed after other higher priority service objects 114 are addressed. In continuing the broken escalator example above, the response engine 128 may determine from the received service object 114 that an escalator (e.g., equipment 112) at the technical place 102 is broken, and that the priority 126 indicates a response time of within 36 hours. Then, for example, based on the equipment information 120, the response engine 128 may determine that the escalator has been serviced twice before for similar problems within the past two months and that a note exists stating that if the problem occurs again within 30 days then new parts need to be ordered from the manufacturer. Then, for example, the response engine 128 may order the required parts from the manufacturer and given the urgency (i.e., 36 hour response time), may have the parts delivered via overnight delivery.

Then, for example, after determining that the anticipated parts necessary for the repair are in stock, the response engine 128 may assign a technician 130 to attend to the technical place 102 to address the service request 110. The response engine 128 may for example generate a service ticket based on the service object 114 and assign the service ticket to the technician 130. According to another example embodiment, the response engine 128 may include a person tasked with performing one or more of the above referenced tasks.

The technician 130 may be a technician, engineer, expert, specialist, agent and/or other service person or team of technicians responsible for responding to the service requests (e.g., 110) assigned to the ERP system 106. For example, the technician 130 may include an electrician who responds to electrical service requests 110 associated with the technical place 102. In continuing the above example, the technician 130 may include an escalator specialist who is trained and certified in escalator maintenance and repair. Then, for example, based on the service ticket, the technician 130 may respond to the technical place 102 to address the service request 110.

According to another example embodiment, the response engine 128 may assign a service ticket to the technician 130. Then, for example, the technician 130 may determine whether or not the proper parts are in stock (rather than, for example, the resolution engine 128 making this determination) and the likely problem affecting the technical place 102 and/or equipment 112. Then, for example, the technician 130 may respond to the technical place 102 to address the service request 110, after determining the necessary parts are in stock.

Then, for example, based on the response to the technical place 102, the technician 130 may provide an update 132 to the ERP system 106. The update 132 may include an update to the status of the service object 114 or technical place object 108, including the layout information 116, equipment information 118 and/or service information 120. For example, the technician 130 may provide the update 132, whereby the service ticket assigned to the technician 130 may be closed as the technician has resolved the service request 110 at the technical place 102. For example, the technician 130 may have repaired the broken escalator. In other example embodiments, the technician 130 may report via the update 132 that the problem will take a certain number of days to be completed or that more parts need to be ordered.

As referenced above, the update 132 may include updates to the technical place object 108. For example, the technical place 102 may receive new equipment 112, in which case the ERP system 106 may update the equipment information 118. The service level agreement associated with the technical place 102 and/or the equipment 112 may be amended, whereby the service information 120 may be amended. Or for example, the technical place 102 may be remodeled where the layout may have changed or a structure may have been added or removed, whereby the layout information 116 may be updated.

Then, for example, an update (e.g., 132) to the service object 114 and/or technical place object 108 may be reflected not only in the ERP system 106, but also in the CRM system 104. For example, when a new service request (e.g., 110) is received, accurate technical place information (i.e., from the technical place object 108) may be used to generate the service object 114. Or for example, if the customer 122 calls to determine the status of a previously reported service request 110, the incident agent 124 may provide accurate information to the customer 122, including the update 132 as provided by the ERP system 106 and/or technician 130.

As referenced above, the system 100 may include variations on the example embodiments just described. For example, rather than being a person, the incident agent 124 may include an automated system, or for example, the service request 110, rather than being received from the customer 122, may include an automated reminder about a scheduled maintenance and/or inspection. According to another example embodiment, the technician 130 may not be a person, but rather may be an automated system, for example an anti-virus system, configured to scan and/or repair computers (e.g., equipment 112) at the technical place 102 remotely via a network. These and other variations may exist in other example embodiments as well.

According to an example embodiment, the system 100 may synchronize or otherwise coordinate information, including the service object 114 and technical place object 108, between the CRM system 104 and ERP system 106. Coordinating such technical place information, may allow for example, for more efficient and accurate responses to customer (e.g., 122) inquiries and service requests 110, including technician (e.g., 130) responses to the technical place 102.

Figure 2:
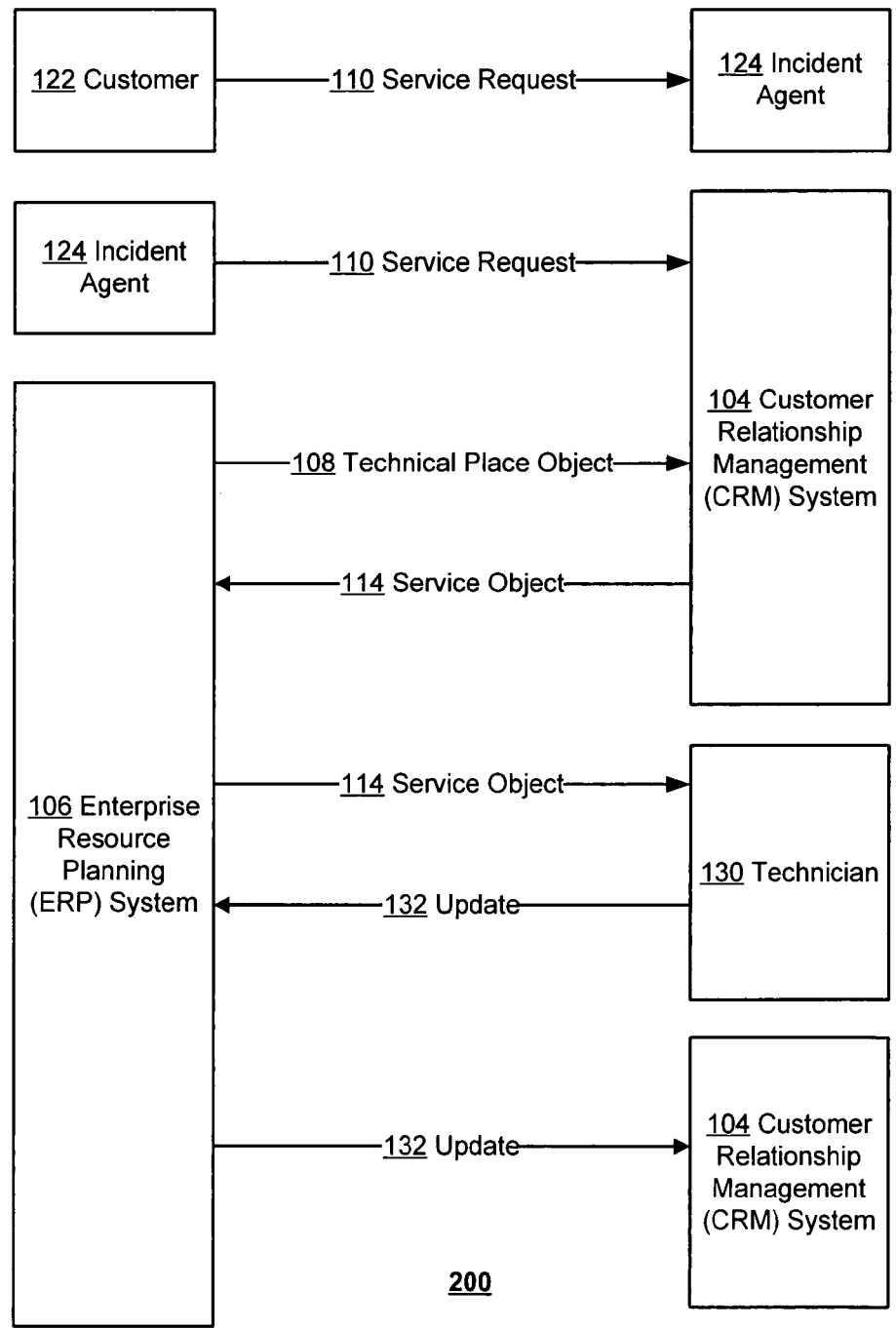
FIG. 2 is a flowchart 200 illustrating example operations of the system 100 of FIG. 1 according to an example embodiment.

FIG. 2 is a flowchart 200 illustrating example operations of the system 100 of FIG. 1 according to an example embodiment. More specifically, FIG. 2 illustrates an operational flow 200 representing example operations related to the technical place servicing support system 100.

In the data flow 200, the customer 122 may provide the service request 110, including a maintenance and/or servicing issue affecting a technical place (e.g., 102), to the incident agent 124. For example, the technical place may include an airport and the customer 122 may include an airport or airline employee who is reporting that a gate at a terminal has lost all electric power. The employee may report the issue (i.e., provide the service request 110) by calling a help desk or submitting a report via a web based system (e.g., incident agent 124) and including such information as which terminal and/or gates are affected, and how long the outage has persisted.

The incident agent 124 may then provide the service request 110 to the customer relationship management (CRM) system 104. The CRM system 104 may then request or otherwise be provided with the technical place object 108 from the ERP system 106. According to an example embodiment, the CRM system 104 may be provided with the technical place object 108 after receipt of the service request 110. According to another example embodiment, the CRM system 104 may have been previously provided with the technical place object 108 prior to receiving the service request 110 from the incident agent 124.

From the service request 110 and the technical place object 108, the CRM system 104, or in other example embodiments the incident agent 124, may generate the service object 114. The service object 114 may include information associated with responding to the service request 110 and may include information derived from both the service request 110 and the technical place object 108. Then, for example, upon a determination that the CRM system 104 and/or the incident agent 124 cannot resolve the service request 110, the service object 114 may be provided to the ERP system 106. According to other example embodiments, the CRM system 104 may not generate the service object 114 for service requests 110 that do not need to be handled by the ERP system 106 or that can be resolved by the incident agent 124 and/or the CRM system 104.

The ERP system 106 may then provide the service object 114, or a portion thereof, to the technician 130. For example, the ERP system 106 may generate a service ticket based on the service object 114, and then in lieu of providing the service object 114 to the technician 130 the ERP system 106 may provide the service ticket to the technician 130.

The technician 130 may respond to the incident at the technical place based at least in part on the information in the service ticket (i.e., service object 114) to address the service request 110. Then, for example, the technician 130 may provide the update 132 to the ERP system 106, reflecting the response to the technical place. For example, the update 132 may include an invoice for the work done or a message indicating more time and/or parts are required.

The ERP system 106 may then update the technical place object 108, if necessary and provide the update 132 the CRM system 104. Updating the technical place object 108 may include updating information about the technical place as maintained by the ERP system 106. For example, the technical place object 108 may include layout information (e.g., 116), equipment information (e.g., 118) and/or service information (e.g., 120). Over time this technical place information may become outdated as the technical place grows or contracts, adds and replaces equipment and/or renegotiates service level agreements. ERP system 106 may then update the technical place object 108 (including the technical place information) based on the update 132, for example.

As discussed above, service object 114 may be generated based at least in part on technical place object 108, however unlike technical place object 108 that may be maintained by ERP system 106, service object 114 may be maintained by CRM system 104. According to an example embodiment, technical place object 108 as updated, may be reflected in service object 114, which may for example include a pointer to technical place object 108. According to another example embodiment, technical place object 108 and/or update 132 may be provided to CRM system 104, which may then update service object 114 to reflect the updated technical place information (i.e., update 132) and provide consistency between the systems.

Figure 3:
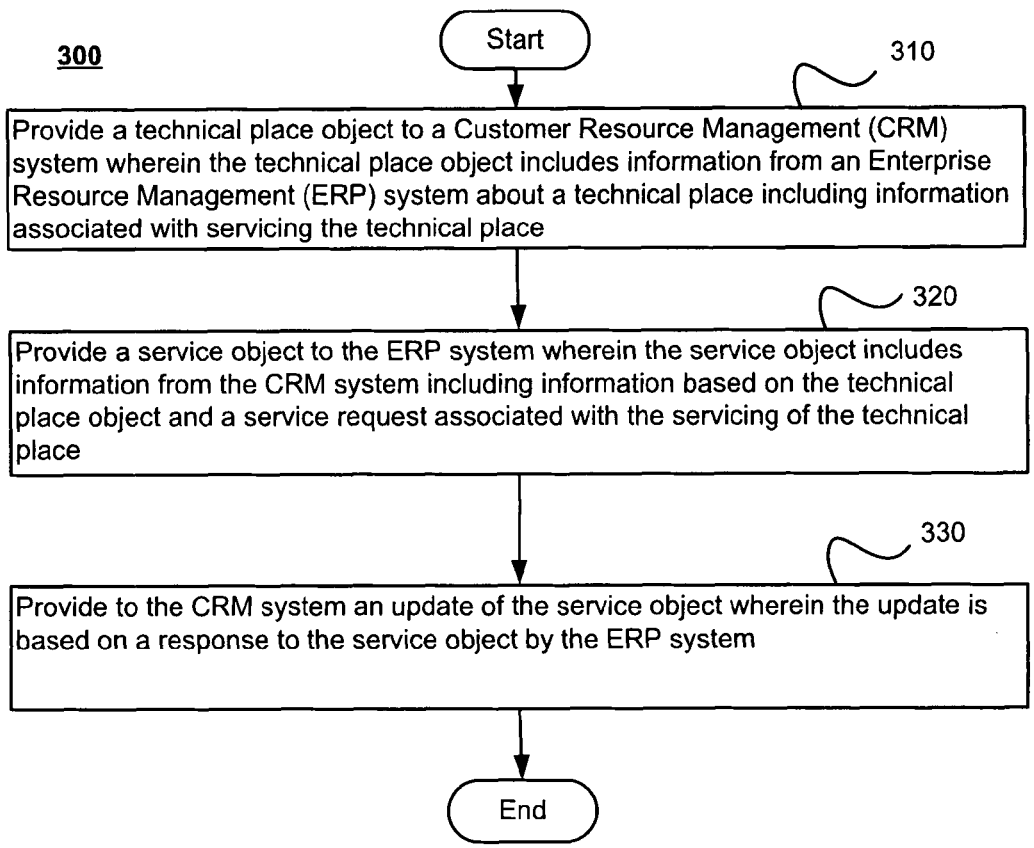
FIG. 3 is a flowchart 300 illustrating example operations of the system 100 of FIG. 1 according to an example embodiment.

FIG. 3 is a flowchart 300 illustrating example operations of the system 100 of FIG. 1 according to an example embodiment.

After a start operation, a technical place object may be provided to a Customer Resource Management (CRM) system wherein the technical place object includes information from an Enterprise Resource Management (ERP) system about a technical place including information associated with servicing the technical place (310). For example, as shown in FIG. 1, the technical place object 108 including the layout information 116, equipment information 118 and service information 120 may be provided from the ERP system 106 to the CRM system 104.

Then, a service object may be provided to the ERP system wherein the service object includes information from the CRM system including information based on the technical place object and a service request associated with the servicing of the technical place (320). For example, the CRM system 104 may receive the service request 110 and the technical place object 108 and may generate the service object 114. Then, for example, the service object 114 may be provided from the CRM system 104 to the ERP system 106.

An update of the service object may be provided to the CRM system, wherein the update is based on a response to the service object by the ERP system (330). For example, the response engine 128 may determine that the technician 130 address the service request 110 at the technical place 102. Then, for example, the technician 130 may provide the update 132, based on the work performed at the technical place 102 by the technician 130, to the ERP system 106. The ERP system 106 may then provide the update 132 to the CRM system 104 to update the service object 114. Then, for example, the update 132 may be reflected throughout the system 100, including both the CRM system 104 and the ERP system 106.

Figure 4:
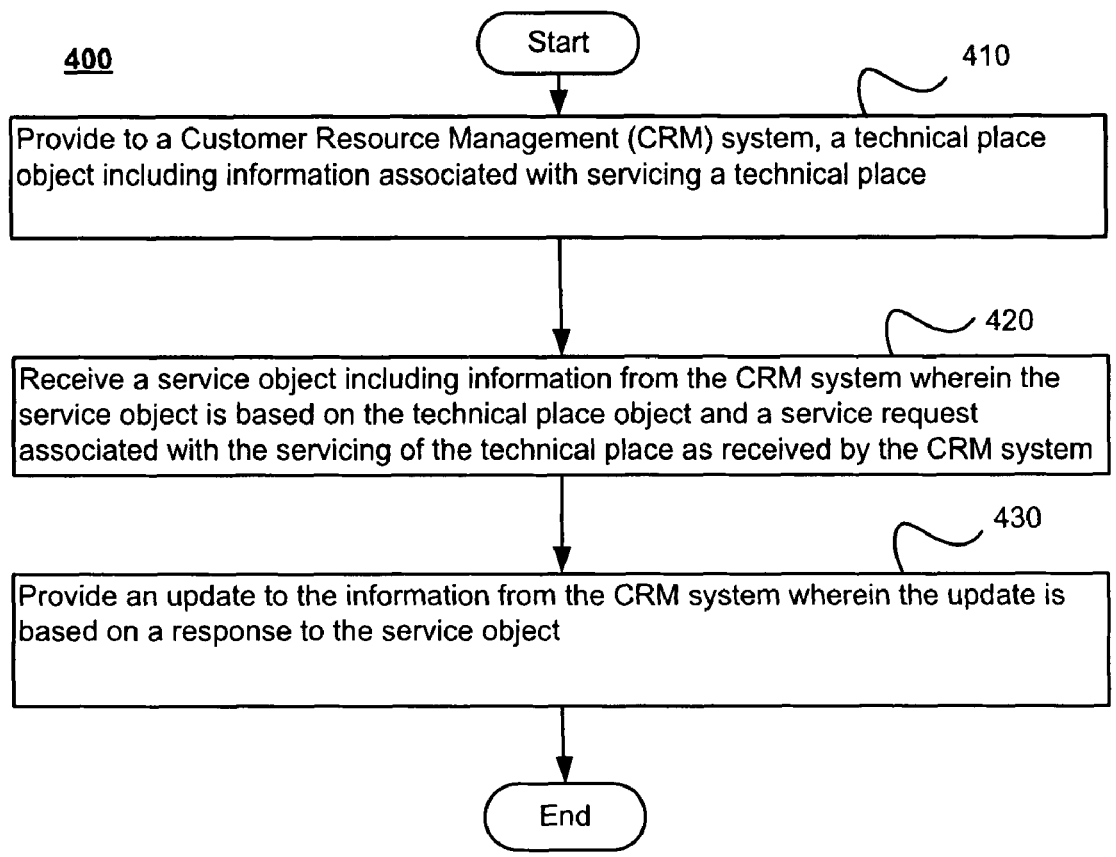
FIG. 4 is a flowchart 400 illustrating example operations of the system 100 of FIG. 1 according to an example embodiment.

FIG. 4 is a flowchart 400 illustrating example operations of the system 100 of FIG. 1 according to an example embodiment.

After a start operation, a technical place object may be provided to a Customer Resource Management (CRM) system, where the technical place object includes information associated with servicing a technical place (410). For example, the ERP system 106 may provide the technical place object 108, including the layout information 116, equipment information 118 and service information 120, to the CRM system 104.

Then a service object including information from the CRM system may be received, where the service object is based on the technical place object and a service request associated with the servicing of the technical place as received by the CRM system (420). For example, the ERP system 106 may receive the service object 114 including information from the technical place object 108 and the service request 110, from the CRM system 104.

Then an update to the information from the CRM system may be provided, where the update is based on a response to the service object (430). For example, the ERP system 106 may provide the update 132 to the CRM system 104, where the update 132 includes a response to the service object 114 as determined by the response engine 128.

Figure 5:
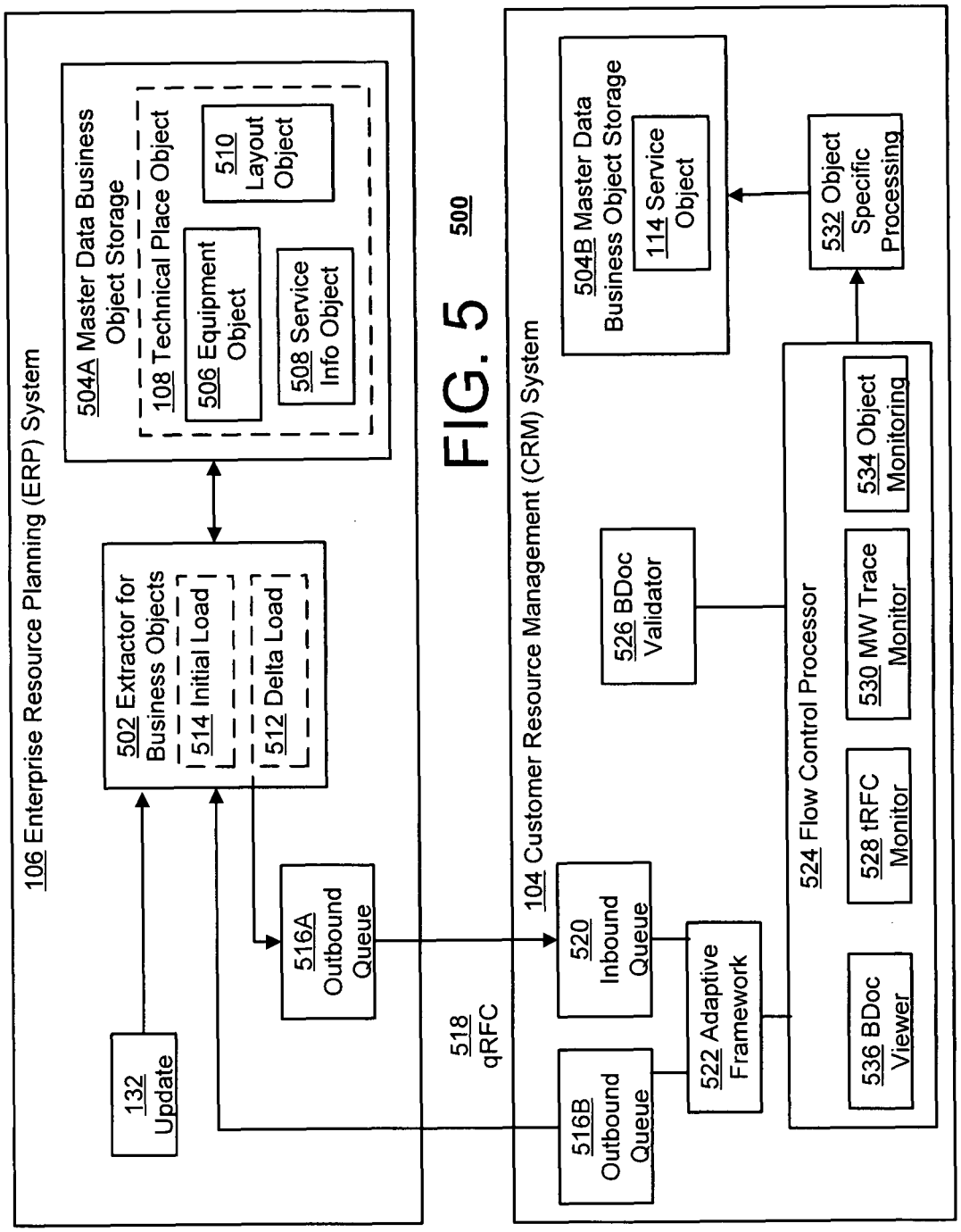
FIG. 5 is a block diagram of an example system 500 including a CRM system and an example ERP system, illustrating interactions between the CRM and ERP systems according to an example embodiment.

FIG. 5 is a block diagram of an example system 500 including a CRM system 104 and an example ERP system 106, illustrating interactions between the CRM and ERP systems according to an example embodiment.

An update 132 may be provided to the ERP system 106. The update 132 may include any change and/or update to information stored by the ERP and/or CRM systems (e.g., 106 and 104, respectively). The update 132 may include information about the technical place including the layout, equipment and/or service information. For example, the update 132 may include work performed and/or to be performed with respect to the technical place.

The update 132 may be provided to an extractor for business objects 502, which may be referred to as an extractor 502, for brevity. The extractor 502 may include one or more processors configured to provide and/or receive information associated with one or more business objects of the ERP system 106. For example, the extractor 502 may receive the update 132 and then provide the update 132 to a master data business object storage 504A.

The master data business object storage 504A may include a memory (e.g., a random access memory, a hard disk, or an optical disk) storing one or more business objects, data and/or other information associated with servicing a technical place. For example, the master data business objects 508A may include a database, spreadsheet and/or other memory storage unit. The master data business object storage 504A may include the technical place object 108.

As described above, the technical place object 108 may include information associated with servicing one or more technical places, including equipment information, service information and/or layout information. According to an example embodiment, the equipment information, service information and/or layout information associated with servicing the one or more technical places may be included in a business object format as well. For example, the master data business object storage 504A may include an equipment object 506, a service info object 508 and/or a layout object 510. The equipment object 506, a service info object 508 and/or a layout object 510 may be included as part of and/or separate from the technical place object 108. The business objects (e.g., 108, 506, 508 and 510) may include a business object, business document and/or other formatting or layout for the information included with each object.

The equipment object 506 may include information associated with equipment stored at or otherwise housed at a technical place. For example, the CRM system 104 may receive a service request about a piece of equipment housed at a technical place. Then for example, the equipment object 506 may include information about the equipment associated with the service request, for example manufacturer and model information about the equipment to be serviced. According to another example embodiment, the equipment object 506 may include updated and/or new equipment information received by the ERP system 106 which is to be provided to update the CRM system 104.

The service info object 508 and layout object 510 may be similar or substantially similar to the equipment object 506 and/or technical place object 108 as described above, except that the service info object 508 and layout object 510 may include service information such as service level agreements and layout information such as blueprints, respectively.

The extractor 502 may provide the update 132 to update the information stored by the master data business object storage 504A in the technical place object 108, equipment object 506, service info object 508 and/or layout object 510. The extractor 502 may also determine a delta load 512 based at least in part on the update 132. According to another example embodiment, the update 132 may be provided directly to the master data business object storage 504A.

The delta load 512 may include a determination of what information, as stored by the master data business object storage 504A and/or received via the update 132, is to be provided to update the CRM system 104 to effect a change in the data stored by the CRM system. For example, the delta load 512 may be determined based at least in part on the update 132. According to another example embodiment, the delta load 512 may be determined based on what information in the master data business object storage 504A has changed since a prior update or load to the CRM system 104.

The extractor 502 may extract information from the master data business object storage 504A and/or provide information to the CRM system 104 based on an initial load 514. The initial load 514 may include a determination associated with information requested by the CRM system 104. For example, as discussed above, the CRM system 104 may receive a service request associated with a technical place. Then for example, the CRM system 104 may provide the service request or information therefrom to the ERP system 106, which may be received by the extractor 502. The initial load 514 may then be based at least in part on the provided service request information. Then for example, based on the initial load 514, the extractor 502 may extract or otherwise receive from the master data business object storage 504A one or more business objects associated with the initial load 514.

Upon receiving one or more business objects associated with the delta load 512 and/or initial load 514, the extractor 502 may wrap or otherwise package the object(s) for transmission to the CRM system 104. For example, the extractor 502 may include, append or wrap the business object(s) in into an exchange structure such as an extensible markup language (XML) object and then provide the wrapped business object(s) to an outbound queue 516A.

The outbound queue 516A may include a tool used to exchange information between two or more systems. The outbound queue 516A may receive data from one or more systems and provide the data, or a portion thereof, to one or more other systems according to a first-in, first-out (FIFO) implementation. For example, the outbound queue 516A may queue, hold or otherwise store wrapped business objects (as received from the extractor 502) and/or other information for transmission to the CRM system 104. Then for example, the outbound queue 516A may provide the wrapped business objects to an inbound queue 520 of the CRM system 104, via a queued remote function call (qRFC) 518 using a FIFO approach.

The qRFC 518 may be used to call functionality between different systems. A remote function call (RFC) may provide for data interchange between a client and a server, and can be used to return data from the server to the client. The qRFC 518 may include an RFC (e.g., data interchange) between the ERP system 104 and the CRM system 106, whereby the data to be exchanged may be queued for some period of time and/or until the occurrence of an event.

The qRFC 518 may cause data (e.g., wrapped business objects) to be received from the outbound queue 516A on the ERP system and provided data to an inbound queue 520 on the CRM system. The inbound queue 520 may be similar or substantially similar to the outbound queue 516A, and may ensure or otherwise provide that data received by the CRM system 104 is processed in a serial manner. For example the inbound queue 520 may provide received data (e.g., wrapped business objects transmitted via the qRFC 518) to an adaptive framework 522 using a FIFO approach, whereby the data is processed by the CRM system 104 in the order in which it was received.

The adaptive framework 522 may receive the transmitted or transferred business objects from the inbound queue 520 and unwrap them. As discussed above, the extractor 502 may wrap a business object in an exchange format, such as XML, and the adaptive framework 522 may then unwrap the business object (as wrapped by the extractor 502) and restore or otherwise format the data into a business document (BDoc) or business object format to be read and/or processed by one or more components of the CRM system 104. For example, the adaptive framework 522 may provide and/or format the business objects and/or the information contained within into a business document (BDoc) format. The BDoc format may include one or more formats or arrangements of information associated with one or more business objects. For example, each business object (e.g., technical place object 108, equipment object 506, service info object 508, and layout object 510) may be associated with one or more BDoc formats.

The adaptive framework 522 may then provide the BDoc(s) (e.g., unwrapped business objects) to a flow control processor 524. The flow control processor 524 may control processing of the BDocs by the CRM system 104. For example, the flow control processor 524 may call services, such as a BDoc validator 526, and/or provide monitoring capabilities on the status of processing as will be discussed below.

The BDoc validator 526 may error check business documents (BDocs). For example, the BDoc validator 526 may perform error checking on the BDocs as received from the adaptive framework 522 via the flow control processor 524. The BDoc validator 526 may check the information within the BDocs (and/or business objects) to verify that the information is consistent with the type of business object used, if the information is properly formatted, etc. For example, the BDoc validator 526 may error-check a service information BDoc to see if the information is properly formatted and/or consistent with how service information is to be formatted. Then for example, the BDoc validator 526 may perform similar functions with respect to the technical place object 108, equipment object 510 and/or layout object 514 including information therewith. In other example embodiments, the system 500 may include multiple BDoc validators (e.g., 526), each one specialized for one or more types of information, objects and/or business documents.

If the BDoc validator 526 determines that there is an error with a received BDoc, then the flow control processor 524 may request that a new business object be provided by the ERP system 106. For example, a transaction remote function call (tRFC) monitor 528 (of the flow control processor 524) may relay the error message as received from a middleware (MW) trace monitor 530 to the adaptive framework 522, which may either provide the error message to the outbound queue 516A and/or the inbound queue 520.

The MW trace monitor 530 may monitor middleware of one or more systems. For example, the MW trace monitor 530 may monitor service calls by the flow control processor 524 to one or more services, such as the BDoc validator 526. The MW trace monitor 530 may for example determine the result from the BDoc validator 526 (e.g., whether any errors exist with the BDoc) and provide the result to the tRFC monitor 528.

The tRFC monitor 528 may ensure that the BDocs undergo transactional processing (e.g., all or nothing processing). For example, the tRFC monitor 528 may determine from the MW trace monitor 530 that the BDoc validator 526 has determined that there is an error or other issue with a BDoc. The tRFC monitor 528 may then request a retransmittal of the entire transaction (e.g., all the objects, documents or other information transmit with the BDoc) associated with the error. Then if the adaptive framework 522 cannot repair the error, the ERP system may retransmit a new wrapped business object to the inbound queue 520 of the CRM system 104 as described above. During retransmittal, the tRFC monitor 528 may ensure or otherwise monitor to make sure that no other business objects are transmit via the qRFC 518 while the prior business object(s) and/or BDoc(s) is being processed. According to an example embodiment, the request for retransmittal may be provided to the ERP system via the outbound queue 516B (which may be similar or substantially similar to the outbound queue 516A), which then may be provided to the extractor 502. According to another example embodiment, the request for retransmittal may backtrack up from the inbound queue 518 to the outbound queue 516A via the qRFC 518.

The BDoc validator 526 may determine that a wrapped business object, even after retransmittal still includes errors. Then for example, the BDoc validator 526 may determine that the transmission is unsuccessful and unrepairable, whereby then next packet or wrapped business object(s) may be transmitted via the qRFC 518.

After the BDoc validator 526 has validated that a BDoc has properly arrived and been unwrapped, the flow control processor 524 may provide the BDoc to an object specific processing block 532. The object specific processing 532 may receive the business object(s) from the flow control processor 524 and update the master data business object storage 504B (which may be similar or substantially similar to the master data business object storage 504A). For example, the object specific processing 532 may update the service object 114, including an instance of the technical place object 108 included with the service object 114 as discussed above.

An object monitor 534 may monitor the object specific processor 532. For example, the object monitor 534 may determine whether the information received from the ERP system 106 was properly created/updated in the master data business objects 508B, then provide the determination to a BDoc viewer 536.

The BDoc viewer 536 may include a monitor displaying information transfers between the ERP system 106 and the CRM system 104. For example, the BDoc viewer 536 may include an interface a user may use to monitor whether information was transferred successfully between the ERP system 106 and CRM system 104. For example, a successful transfer where no errors occurred may be indicated by a green color, a transfer with errors that were resolved may be indicated by a yellow color, and a transfer with unresolved errors may be indicated by a red color. Then for example may quickly determine the status of transfers between the systems based at least in part on the coloured indicators. The BDoc viewer 536 may include information received from the tRFC monitor 528, MW trace monitor 530 and/or object monitor 534.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method comprising:

providing, via one or more processors, a technical place object to a Customer Resource Management (CRM) system wherein the technical place object includes information from an Enterprise Resource Management (ERP) system about a technical place including information associated with servicing the technical place;

providing, via the one or more processors, a service object to the ERP system wherein the service object includes information from the CRM system including information based on the technical place object and a service request associated with the servicing of the technical place; and providing to the CRM system an update of the service object wherein the update is based on a response to the service object by the ERP system.

2. The method of claim 1 wherein the providing a technical place object comprises loading at least an instance of the technical place object from the ERP system to the CRM system, wherein the ERP system maintains the technical place object.

3. The method of claim 1 wherein the providing a technical place object comprises: receiving a request associated with the information about the technical place, based at least in part on the service request; and providing the technical place object to the CRM system in response to the request.

4. The method of claim 1 wherein the providing a technical place object comprises synchronizing the technical place object between the ERP system and the CRM system.

5. The method of claim 1 wherein the providing a service object comprises:

determining a priority of the service request; and providing the service object to the ERP system based on the priority.

6. The method of claim 1 wherein the providing a service object comprises:

providing the service object to the ERP system, wherein the ERP system is configured to respond to the service request, based at least in part on the service object.

7. The method of claim 1 wherein the providing to the CRM system an update comprises:

receiving the update from the ERP system; and providing the update to the CRM system.

8. The method of claim 1 wherein the providing to the CRM system an update comprises synchronizing the service object between the ERP system and CRM system.

9. The method of claim 1 wherein the providing to the CRM system an update comprises updating at least a portion of the information from the CRM system included with the service object.

10. A system comprising:

one or more processors executing code to provide an Enterprise Resource Planning (ERP) system that includes a technical place object associated with the ERP system wherein the technical place object includes information associated with servicing a technical place;

one or more processors executing code to provide a Customer Resource Management (CRM) system configured to determine a service object wherein the service object includes information based on the technical place object and a service request associated with the servicing of the technical place; and wherein the one or more processors executing code to provide the Enterprise Resource Planning (ERP) system are configured to determine an update associated with the service object wherein the update is based on a response to the service object.

11. The system of claim 10 wherein at least a portion of the information associated with the servicing of the technical place is maintained by the ERP system.

12. The system of claim 10 wherein the technical place object includes layout and equipment information associated with servicing the technical place, and wherein the service request is associated with the equipment.

13. The system of claim 10 wherein the technical place object includes a service level agreement associated with servicing the technical place.

14. The system of claim 10 wherein an incident agent is configured to receive the service request.

15. The system of claim 14 wherein the one or more processors executing code to provide the CRM system are configured to generate the service object from the technical place object and the service request as received from the incident agent.

16. The system of claim 10 wherein the one or more processors executing code to provide the ERP system determine, based on the service object, that a technician responds to the service request at the technical place.

17. A method comprising:
providing, via one or more processors, to a Customer Resource Management (CRM) system, a technical place object including information associated with servicing a technical place;
receiving, via the one or more processors, a service object including information from the CRM system wherein the service object is based on the technical place object and a service request associated with the servicing of the technical place as received by the CRM system; and
providing, via the one or more processors, an update to the information from the CRM system wherein the update is based on a response to the service object.

18. The method of claim 17 wherein the providing to a CRM system comprises providing the technical place object as maintained by an Enterprise Resource Planning (ERP) system to the CRM system.

19. The method of claim 17 wherein the providing an update comprises:
determining the response to the service request based on the service object.

20. The method of claim 19 wherein the providing an update comprises:
receiving the update based on a response to the service request by a technician; and
updating the service object wherein the service object is maintained by the CRM system.

* * * * *